United States Patent [19]

van Alem et al.

[11] Patent Number: 4,570,255
[45] Date of Patent: Feb. 11, 1986

[54] DISC-RECORD PLAYER WITH PRESSURE MEANS FOR PRESSING A DISC ONTO A TURNTABLE

[75] Inventors: Antonius A. M. van Alem; Bernardus J. Stinesen, both of Eindhoven, Netherlands

[73] Assignee: U.S. Philips Corporation, New York, N.Y.

[21] Appl. No.: 606,018

[22] Filed: May 2, 1984

[30] Foreign Application Priority Data

May 11, 1983 [NL] Netherlands ................. 8301681

[51] Int. Cl.$^4$ ...................... G11B 3/62; G11B 25/04
[52] U.S. Cl. ............................ 369/270; 360/97
[58] Field of Search ............... 369/270, 271; 360/86, 360/97

[56] References Cited

U.S. PATENT DOCUMENTS

| | | | |
|---|---|---|---|
| 2,762,627 | 9/1956 | Johnson | 369/270 |
| 4,068,851 | 1/1978 | Yamamura | 369/270 |
| 4,347,599 | 8/1982 | Vitale | 369/270 |
| 4,387,454 | 6/1983 | Yamamura et al. | 369/270 |
| 4,391,543 | 7/1983 | Elsing | 360/97 |

FOREIGN PATENT DOCUMENTS 55-125587  9/1980  Japan ........................ 369/270

*Primary Examiner*—Steven L. Stephan
*Attorney, Agent, or Firm*—David R. Treacy

[57] ABSTRACT

A disc-record player includes a pressure apparatus for pressing a disc onto a turntable. A mandril which is coaxial with the turntable engages the edge of a center hole in the disc. The pressure apparatus comprises rollers which can deflect elastically in a radial direction relative to the axis of rotation of the turntable and which are carried by a pressure member. The pressure member is axially movable relative to the mandril and acts on the disc at a radial distance from the center hole. The mandril comprises a conical guide wall whose diameter decreases towards the turntable and which cooperates with the rollers when downward pressing action occurs.

12 Claims, 4 Drawing Figures

DISC-RECORD PLAYER WITH PRESSURE MEANS FOR PRESSING A DISC ONTO A TURNTABLE

BACKGROUND OF THE INVENTION

The invention relates to a disc-record player comprising pressure means for pressing a disc onto a turntable, and a mandril which is coaxial with the turntable and which engages the center hole of the disc. The pressure means comprises rollers which can deflect elastically in a radial direction relative to the axis of rotation of the turntable and which urge the disc against the turntable.

A disc-record player of this type is disclosed in French Patent Specification 2.078.456. In such a known disc-record player the pressure means is integral with the mandril, the rollers being urged radially outwards by an elastic material through apertures in the wall of the mandril. As a result of this movement the rollers act against the edge of the center hole of a disc on the turntable, thereby exerting such a force on the edge of the center hole of the disc that the disc is urged against the turntable. If the edge of the center hole of the disc is not defined accurately, for example due to the presence of burrs formed during manufacture of the disc, the pressure means of the known disc-record player will exert different forces by the rollers on the edge of the center hole, so that an inadequate and/or irregular pressure is exerted on the disc. In practice the pressure means of the known disc-record player is therefore only suitable for use in low-quality disc-record players where a less accurate operation of the pressure means is permissible. In particular, such a pressure means is not suitable for use with optical discs read by means of laser light, for example of the Compact Disc type, in which discs the edge of the center hole is not defined accurately in a vertical direction due to the method of manufacturing these discs.

The known disc-record players for playing optically readable discs employ a pressure means which acts on the disc at some radial distance from the center hole. The force required for pressing down is obtained by cooperation between a magnetic material in the pressure means and an iron ring on the turntable. However, this gives rise to a magnetic stray field which may disturb the operation of other actuators of the disc-record player in the proximity of the pressure means, for example the focusing actuator of the optical head of the player.

Another known possibility is the use of a pressure means arranged on a resilient arm, whose resilience provides an adequate pressure. However, during playing this results in the turntable spindle being continually subjected to an axial load which produces friction and gives rise to an additional torque on the drive motor of the turntable.

SUMMARY OF THE INVENTION

It is the object of the invention to provide a disc-record player, of the type having elastically deflectable rollers, with a simple pressure means which is capable of effectively keeping optically readable discs pressed onto the turntable with an adequate pressure, without thereby impairing the operation of other parts of the disc-record player.

To this end the invention is characterized in that the pressure means comprises a pressure member which is axially movable relative to the mandril, acts on the disc at a radial distance from the center hole, and carries the rollers. The mandril comprises a conical guide wall whose diameter decreases towards the turntable. The guide wall cooperates with the rollers during pressing down.

In this way pressure is exerted on the disc at that location where pressure is permissible in accordance with the specifications of the disc and where the operation of the pressure member cannot be affected by deviations in height around the edge of the center hole of the disc. Another significant advantage is that during operation the mandril and the pressure means constitute a closed system of forces, so that it is not necessary to apply any external force.

A preferred embodiment of the invention is characterized in that each roller has a circularly cylindrical shape and is mounted rotatably on a spring-steel support. After the disc has been put on and the pressure means has been positioned the spring will relax, causing the cylindrical rollers to roll smoothly down the conical guide wall, thereby pressing the disc onto the turntable.

A further preferred embodiment of the invention is characterized in that the spring-steel support comprises a wire spring which extends substantially tangentially of the axis of rotation of the turntable, and which at the side facing the turntable adjoins an abutment wall of the pressure member, which wall extends perpendicularly to the axis of rotation. Each roller is connected to the pressure member by an associated wire spring. In this construction the rollers are readily movable in a radial direction and are easily rotatable about the wire spring, and the rollers are supported effectively in the axial direction by the abutment wall during the upward movement along the conical guide wall when the pressure member is moved away from the turntable.

A further preferred embodiment of the invention is characterized in that the spring-steel support comprises a continuous spiral spring which interconnects the rollers. This embodiment is a simple pressure mechanism which is cheap to manufacture owing to the small number of parts and yet functions effectively.

Yet another preferred embodiment of the invention, in which the mandril comprises a centering cone above the guide wall, which cone has a diameter which decreases towards the free end, is characterized in that the pressure means comprises a ring which is connected to the pressure member near the upper side by a blade spring so as to be movable resiliently in an axial direction. The ring has an inner wall which is positioned against the central cone during pressing down of the disc and an outer wall which positions the rollers in a radial direction when the pressure member is moved away from the turntable. With this construction the rollers are controlled effectively during removal of the pressure means from the turntable, for example in order to replace the disc on the turntable, and are moved to the radially outward positons. Thus, removal of the pressure means is not attended by abrupt movements, which otherwise would occur due to the quick release of the resilient supporting means of the rollers after they have passed the largest diameter of the conical guide wall. As a result, the pressure means can also be applied with a gradual movement in order to press down the disc. This may yield both an improved ease of operation and a longer life of the relevant parts.

Two embodiments of the invention will be described in more detail, by way of example, with reference to the drawings.

DESCRIPTION OF THE PREFERRED ENBODIMENTS

Figure 1:
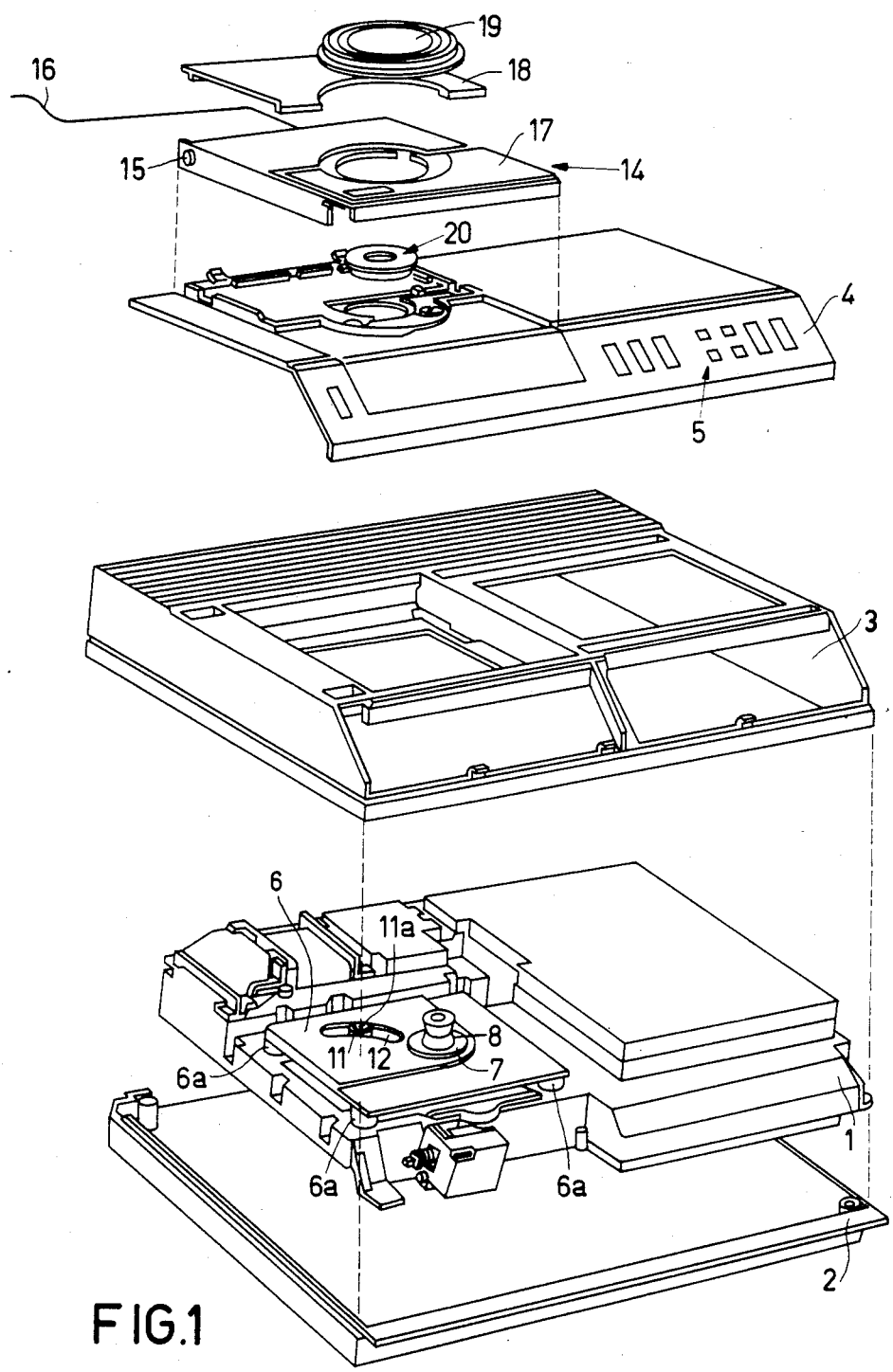
FIG. 1 is a perspective view of various parts of the disc-record player in accordance with the invention.
Figure 2:
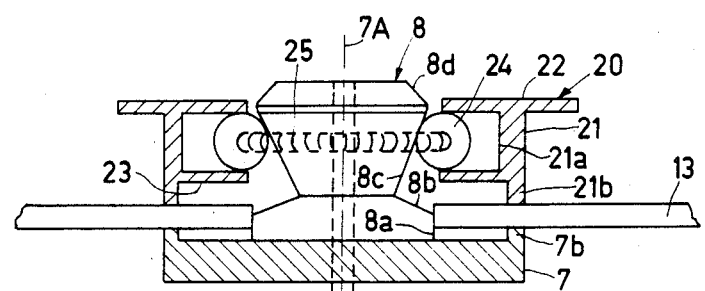
FIG. 2 is an enlarged-scale sectional view of the pressure means, the turntable and the mandril of this turntable in an operating position of the disc-record player shown in FIG. 1.

The disc-record player shown in FIG. 1 comprises a frame 1 which is secured to a bottom plate 2. A housing 3 covers the frame 1 and is secured to the bottom plate 2, a cover 4 being arranged on top of the housing and carrying a number of actuating buttons 5. The frame 1 carries a sub-frame 6, which is connected to the frame 1 by means of four elastic supports 6a. The sub-frame 6 carries a turntable 7 which is provided with a mandril 8 on its upper side. In a manner as shown in FIG. 2 the turntable 7 is connected to a drive motor 9 by a shaft 10, which rotates the turntable 7 about the axis of rotation 7a during operation. The sub-frame 6 further carries an optical pickup head 11, which is provided with an objective 11a at its upper end and which projects from the sub-frame 6 through a slot 12. In a manner not shown the pickup head 11 is connected to the mechanism which enables the pickup head to be moved relative to the axis of rotation 7a of the turntable. In addition to the objective 11a the pickup head comprises a laser unit, not shown, which projects a sharply focused beam onto a disc 13 on the turntable 7 during operation. The disc 13 is an information carrier for audio and/or video signals and has the property of reflecting the light beam emitted by the pickup head 11. The pickup head 11 also receives the reflected beam and converts it into a signal which is transferred to further sections of the disc-record player.

On the upper side of the cover 4 a lid 14 is arranged which is pivotally connected to the housing 3 by means of a pivot pin 15. A spring 16 tends to urge the lid away from the cover 4 towards an open position. The lid 14 has a transparent portion 17 whose upper side near the pivot pin 15 is covered by an opaque portion 18 in such a way that in the closed position of the lid the light beam issuing from the pickup head 11 is shielded even in the absence of a disc. A circular disc 19 is arranged on top of the lid 14. An annular pressure means 20 is arranged in the space between the disc 19 and the transparent portion 17. As is shown in FIG. 2, the pressure means 20 comprises a pressure member 21. The member 21 has a flange 22 retained between the disc 19 and the transparent portion 17 in such a way that some axial displacement of the pressure member 21 along the axis 7a of the mandril 8 is possible when the lid 14 is closed. Further, the pressure member 21 comprises a ring 23 which is axially spaced from the flange 22, facing walls of the flange 22 and the ring 23 extending parallel to one another and extending perpendicularly to the axis of rotation 7a during operation.

A plurality of circularly cylindrical rollers 24, in the present embodiment five, are arranged, in the space between the flange 22 the ring 23. The rollers 24 are mounted in the space so as to be rotatable about a spring-steel support comprising a continuous spiral spring 25. Preferably, the rollers 24 are made of a synthetic material such as nylon. Spacers are arranged around the spiral spring 25 between the adjacent rollers 24 in a manner not shown, so that the rollers are spaced equidistantly inside the pressure member 21. Moreover, the rollers 24 are arranged in such a manner that when the pressure means 20 is removed the rollers remain positioned between the flange 22 and the ring 23, and an inner wall 21a of the pressure member between the flange 22 and the ring 23 has such a diameter that when the disc pressure member 21 is fitted onto the mandril 8 the rollers can deflect freely in a radial direction within the space.

The mandril 8 comprises a cylindrical portion 8a which adjoins the turntable 7 and which has a diameter which is adapted to the diameter of the center hole of the disc 13. The portion 8a adjoins a conical portion 8b which has a centering function when the disc is put on. The portion 8b adjoins a conical guide wall 8c whose diameter decreases towards the turntable 7. The conical wall cooperates with the rollers 24 to press down the disc 13 after the pressure member 21 has been moved onto the mandril 8 by swinging down the lid 14. The guide wall 8c adjoins a centering cone 8d whose diameter decreases towards the free end of the mandril 8. The centering cone 8d serves for centering disc 13 and also urges the rollers 24 radially outwards when the pressure member 21 is applied.

When a disc 13 is put onto the turntable 7 the disc is centered on the mandril 8 by the centering cone 8b and the conical portion 8d. The edge of the center hole of the disc 13 is then positioned around the cylindrical portion 8a, and the disc is supported on the turntable 7 by an annular support 7b. This support 7b is radially spaced from the cylindrical portion 8a. By closing the lid 14 the pressure means 20 is subsequently moved towards the mandril 8, the rollers rolling down the guide wall 8c under the spring force exerted by the spiral spring 25 after the rollers 24 have been slid over the centering cone 8b. Owing to this movement a pressure ring 21b on the underside of the pressure member 21 is positioned against the disc. In the same way as the support 7b the pressure ring 21b is also radially spaced from the edge of the center hole of the disc 13. This is important in order to ensure that the disc 13 is pressed down at that location where this is permissible in conformity with the disc specifications. Pressing down at the location of the edge of the center hole would give rise to problems because at this location the thickness the disc may deviate for example due to burrs on the edge of the hole formed during manufacture of the disc. This may happen in particular in the case of optically readable audio discs of the Compact Disc type.

As they roll down the guide wall 8c of the mandril 8 the rollers 24 exert a downward force on the pressure member 21, so that the pressure ring 21b presses the disc 13 firmly against the annular support 7b. As a result of the arrangement of the rollers 24 local variations in thickness of the disc 13 are compensated for effectively. In this respect it is important that when the rollers roll down the guide wall 7c only a minimal friction occurs in order to ensure that the resulting force exerted on the disc by the ring 21b is as large as possible.

The pressure means 20 precludes the occurrence of slip between the disc 13 and the turntable 7 when the motor 9 is started and ensures that an eccentricity of the disc 13 relative to the mandril 8 is evened out by pressing the disc onto the conical portion 8b, the pressure means 20 also ensuring that the disc 13 cannot come off the turntable 7 during rotation of the turntable. For changing the disc 13 the lid 14 has to be swung open, so that the pressure means 20 is moved upwards in such a way that the rollers 24 remain inside the space between the flange 22 and the ring 23 in the relaxed condition of the spiral spring 25.

The pressure means 20 shown has the advantage that no undesired external force is exerted on the turntable 7 in the hold-down position. As a result of this, the shaft 10 in the motor 9 are not subjected to any undesired loads. Moreover, because of the wholly mechanical nature of the pressure means 20 the operation of other parts of the disc-record player cannot be disturbed. It has been found that discs having a thickness of approximately 0.8 to 3 mm can be held down effectively by the pressure means 20 used in the present embodiment. It is to be noted that the pressure characteristic of the pressure means 20 may be influenced by the choice of the diameter of the rollers 24, the slope of the conical guide wall 8c, and the spring force of the spiral spring 25.

Figure 3:
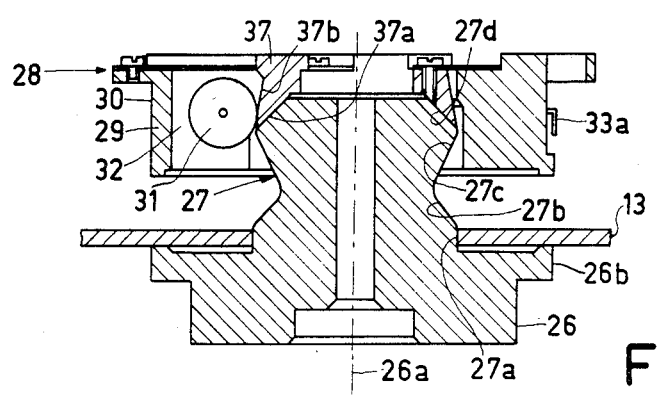
FIG. 3 is a sectional view of the same parts as in FIG. 2 in a second embodiment of the invention in which the pressure means is situated on the upper end of the mandril.
Figure 4:
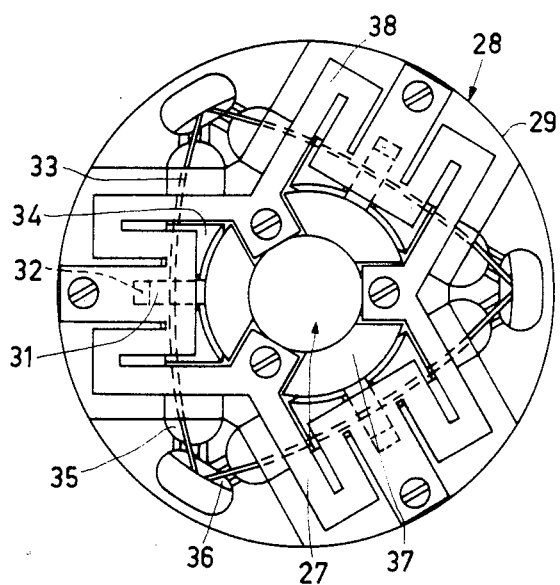
FIG. 4 is a plan view of the part shown in FIG. 3 taken at the location of the arrow IV.

In the second embodiment, shown in FIGS. 3 and 4, a turntable 26, which is driven by a motor in the same manner, not shown, as in the previous embodiment, is provided with an annular support 26b. Above the turntable 26 a mandril 27 is rigidly connected to the support 26b. In the same way as the mandril 8, the mandril 27 comprises a cylindrical portion 27a, an adjoining conical portion 27b, a conical guide wall 27c adjoining the last-mentioned portion, and a centering cone 27d at the upper end. This second embodiment uses a pressure means 28 comprising a pressure member 29 which at its upper side is connected to a lid 14 so as to be axially movable in the same way as in the preceding embodiment. The pressure member 29 comprises a cylindrical circumferential wall 30 whose lower part has the same function as the pressure ring 21b in the preceding embodiment. In the present embodiment three circularly cylindrical rollers 31 are arranged inside the member 29. These rollers are guided in a radial direction relative to the axis of rotation 26a of the turntable between parallel walls of slots 32 in the pressure member 29. Each roller is mounted on an associated spring-steel support comprising a wire spring 33 which extends substantially tangentially of the axis of rotation 26a. At the side facing the turntable 26 the wire spring 33 adjoins an abutment wall 34 of the pressure member, which wall extends perpendicularly to the axis of rotation. A block 35 at both ends of the wall 34 inhibits axial movement of the wire spring 33 but permits radial movement. The ends 33a of the wire spring are bent at right angles and are inserted in openings 36 in the pressure member 29.

The pressure member 29 further comprises a ring 37, which is positioned by an inner wall 37a against the centering cone 27d in the position of the pressure means 28 shown in FIG. 3. Further, the ring 37 has an outer wall 37b which during a displacement of the pressure member keeps the rollers 31 positioned in a radial direction and specifically precludes a further radially inward movement of the rollers 31 in this position of the pressure means 28. On the upper side blade springs 38 connect the ring 37 to the pressure member 29 so that the member is movable resiliently in the axial direction. The ring 37 of the pressure means 28 is positioned against the centering cone 27b after closure of the lid 14. Thus, as the lid 14 is pressed further downwards a comparatively low pressure on the lid is sufficient to cause the rollers 31 to move along the guide wall 27c, which movement proceeds smoothly. The wire springs 33 ensure that as the rollers 31 roll down the guide wall 27c the circumferential wall 30 exerts a force on the disc 13, so that the disc is urged onto an annular support 26b of the turntable in the same way as in the first embodiment. During this movement of the pressure member 29 the ring 37 stays behind this is possible because the ring is connected to the member 29 by the blade springs 38. When the lid 14 is swung open the return movement of the pressure means 28 causes the rollers again to be positioned by the outer wall 37b after having passed the guide wall 27c. In this way the rollers 31 cannot cause shocks, which may lead to damage of the pressure means. Moreover, the presence of the ring 37 leads to an improved ease of operation of the disc-record player. It is to be noted that such a ring 37 may also be employed in the first embodiment.

What is claimed is:

1. A disc-record player including a turntable having an axis of rotation, for cooperation with a circular generally planar member placed on the turntable and having a centrally disposed hole having an edge, said player comprising:
a mandril which is coaxial with the turntable, and which engages the edge of the hole of a member placed on the turntable, said mandril comprising a conical guide wall whose diameter decreases toward the turntable; and
pressure means for pressing the member onto the turntable, comprising:
a pressure member which is axially movable relative to the mandril and which acts on the member at a radial distance from the hole, said pressure member including an abutment wall which extends perpendicularly to the axis of rotation,
a plurality of circularly cylindrical rollers carried on the pressure member, arranged to be deflectable elastically in a radial direction relative to said axis of rotation, and to urge the member against the turntable by cooperation with said conical guide wall during a downward pressing action, and
a spring-steel support on which said rollers are rotatably mounted, said support comprising a wire spring which extends substantially tangentially of the axis of rotation of the turntable and which, at the side of the spring which faces the turntable, adjoins said abutment wall, each roller being connected to the pressure member by the associated wire spring.

2. A disc-record player including a turntable having an axis of rotation, for cooperation with a circular generally planar member placed on the turntable and having a centrally disposed hole having an edge, said player comprising:
a mandril which is coaxial with the turntable, and which engages the edge of the hole of a member placed on the turntable, said mandril comprising a conical guide wall whose diameter decreases toward the turntable; and pressure means for pressing the member onto the turntable, comprising:
a pressure member which is axially movable relative to the mandril and which acts on the member at a radial distance from the hole,
a plurality of circularly cylindrical rollers carried on the pressure member, arranged to be deflectable elastically in a radial direction relative to said axis of rotation, and to urge the member against the turntable by cooperation with said conical guide wall during a downward pressing action, and
a spring-steel support on which said rollers are rotatably mounted, said support comprising a continuous spiral spring which interconnects the rollers.

3. A disc-record player as claimed in claim 1, characterized in that the rollers are guided in a radial direction relative to the axis of rotation of the turntable between parallel walls of slots in the pressure member.

4. A disc-record player as claimed in claim 1, characterized in that the rollers are guided between guide walls which extend perpendicularly to the axis of rotation of the turntable.

5. a disc-record player as claimed in claim 3, the mandril comprising a centering cone above the guide wall, said cone being supported at one axial extremity and having an opposite free end, said cone having a diameter which decreases towards the free end, characterized in that the pressure means comprises a ring which near the upper side is connected to the pressure member by a blade spring so as to be movable resiliently in an axial direction, which ring has an inner wall which is positioned against the centering cone during pressing down of the disc and an outer wall which positions the rollers in a radial direction when the pressure member is moved away from the turntable.

6. A disc-record player as claimed in claim 4, the mandril comprising a centering cone above the guide wall, said cone being supported at one axial extremity and having an opposite free end, said cone having a diameter which decreases towards the free end, characterized in that the pressure means comprises a ring which near the upper side is connected to the pressure member by a blade spring so as to be movable resiliently in an axial direction, which ring has an inner wall which is positioned against the centering cone during pressing down of the disc and an outer wall which positions the rollers in a radial direction when the pressure member is moved away from the turntable.

7. A disc-record player as claimed in claim 2, characterized in that the rollers are guided in a radial direction relative to the axis of rotation of the turntable between parallel walls of slots in the pressure member.

8. A disc-record player as claimed in claim 2, characterized in that the rollers are guided between walls which extend perpendicularly to the axis of rotation of the turntable.

9. A disc-record player as claimed in claim 7, the mandril comprising a centering cone above the guide wall, said cone being supported at one axial extremity and having an opposite free end, said cone having a diameter which decreases towards the free end, characterized in that the pressure means comprises a ring which near the upper side is connected to the pressure member by a blade spring so as to be movable resiliently in an axial direction, which ring has an inner wall which is positioned against the centering cone during pressing down of the disc and an outer wall which positions the rollers in a radial direction when the pressure member is moved away from the turntable.

10. A disc-record player as claimed in claim 8, the mandril comprising a centering cone above the guide wall, said cone being supported at one axial extremity and having an opposite free end, said cone having a diameter which decreases towards the free end, characterized in that the pressure means comprises a ring which near the upper side is connected to the pressure member by a blade spring so as to be movable resiliently in an axial direction, which ring has an inner wall which is positioned against the centering cone during pressing down of the disc and an outer wall which positions the rollers in a radial direction when the pressure member is moved away from the turntable.

11. A disc-record player as claimed in claim 1, the mandril comprising a centering cone above the guide wall, said cone being supported at one axial extremity and having an opposite free end, said cone having a diameter which decreases towards the free end, characterized in that the pressure means comprises a ring which near the upper side is connected to the pressure member by a blade spring so as to be movable resiliently in an axial direction, which ring has an inner wall which is positioned against the centering cone during pressing down of the disc and an outer wall which positions the rollers in a radial direction when the pressure member is moved away from the turntable.

12. A disc-record player as claimed in claim 2, the mandril comprising a centering cone above the guide wall, said cone being supported at one axial extremity and having an opposite free end, said cone having a diameter which decreases towards the free end, characterized in that the pressure means comprises a ring which near the upper side is connected to the pressure member by a blade spring so as to be movable resiliently in an axial direction, which ring has an inner wall which is positioned against the centering cone during pressing down of the disc and an outer wall which positions the rollers in a radial direction when the pressure member is moved away from the turntable.

* * * * *